United States Patent
Lu et al.

(10) Patent No.: US 8,968,925 B2
(45) Date of Patent: *Mar. 3, 2015

(54) METAL-DOPED TRANSITION METAL HEXACYANOFERRATE (TMHCF) BATTERY ELECTRODE

(71) Applicant: Sharp Laboratories of America, Inc., Camas, WA (US)

(72) Inventors: Yuhao Lu, Vancouver, WA (US); Jong-Jan Lee, Camas, WA (US); David Evans, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/907,892

(22) Filed: Jun. 1, 2013

(65) Prior Publication Data

US 2013/0266861 A1 Oct. 10, 2013

Related U.S. Application Data

(63) Continuation-in-part of application No. 13/897,492, filed on May 20, 2013, which is a continuation-in-part of application No. 13/872,673, filed on Apr. 29, 2013, which is a continuation-in-part of application No.

(Continued)

(51) Int. Cl.
*H01M 4/136* (2010.01)
*H01M 4/1397* (2010.01)
(Continued)

(52) U.S. Cl.
CPC ............ *H01M 4/136* (2013.01); *H01M 4/1397* (2013.01); *H01M 4/58* (2013.01); *Y02E 60/122* (2013.01); *H01M 10/054* (2013.01)
USPC ..................................... 429/211; 252/519.14

(58) Field of Classification Search
CPC ..... H01M 4/136; H01M 4/58; H01M 10/054; H01M 4/133; H01M 4/134; H01M 4/04; H01M 4/381; Y02E 60/122; Y02E 60/50; C01B 31/00; C01B 31/04; C01B 31/30; C01D 1/02
USPC .............. 429/211, 231.95, 231.6; 252/519.14
See application file for complete search history.

(56) References Cited

U.S. PATENT DOCUMENTS

2012/0328936 A1* 12/2012 Wessells et al. ............... 429/188
2013/0244100 A1* 9/2013 Tan et al. ....................... 429/199

FOREIGN PATENT DOCUMENTS

JP 2011-246303 12/2011
WO WO2012/177932 12/2012

OTHER PUBLICATIONS

V.D. Neff, Some performance characteristics of a Prussian Blue battery, Journal of Electrochemical Society, 132 (1985) 1382-1384.

(Continued)

*Primary Examiner* — Mark F Huff
*Assistant Examiner* — Monique Wills
(74) *Attorney, Agent, or Firm* — Law Office of Gerald Maliszewski; Gerald Maliszewski (57) ABSTRACT

A method is provided for synthesizing a metal-doped transition metal hexacyanoferrate (TMHCF) battery electrode. The method prepares a first solution of $A_xFe(CN)_6$ and $Fe(CN)_6$, where A cations may be alkali or alkaline-earth cations. The method adds the first solution to a second solution containing M-ions and M'-ions. M is a transition metal, and M' is a metal dopant. Subsequent to stirring, the mixture is precipitated to form $A_xM_cM'_dFe_z(CN)_n \cdot mH_2O$ particles. The $A_xM_cM'_dFe_z(CN)_n \cdot mH_2O$ particles have a framework and interstitial spaces in the framework, where M and M' occupy positions in the framework. Alternatively, the method prepares $A_aA'_bM_yFe_z(CN)_n \cdot mH_2O$ particles. A and A' occupy interstitial spaces in the $A_aA'_bM_yFe_z(CN)_n \cdot mH_2O$ particle framework. A metal-doped TMHCF electrode is also provided.

22 Claims, 5 Drawing Sheets

Related U.S. Application Data

13/752,930, filed on Jan. 29, 2013, which is a continuation-in-part of application No. 13/603,322, filed on Sep. 4, 2012, which is a continuation-in-part of application No. 13/523,694, filed on Jun. 14, 2012, which is a continuation-in-part of application No. 13/449,195, filed on Apr. 17, 2012, which is a continuation-in-part of application No. 13/432,993, filed on Mar. 28, 2012.

(51) Int. Cl.
*H01M 4/58* (2010.01)
*H01M 10/054* (2010.01)

(56) References Cited

OTHER PUBLICATIONS

N. Imanishi, et al., Lithium intercalation behavior into iron cyanide complex as positive electrode of lithium secondary battery, Journal of Power Sources, 79 (1999) 215-219.

Y. Lu, L. Wang, J. Cheng, J.B. Goodenough, Prussian blue: a new framework for sodium batteries, Chemistry Communication, 48(2012)6544-6546.

L. Wang, Y. Lu, J. Liu, M. Xu, J. Cheng, D. Zhang, J.B. Goodenough, A superior low-cost cathode for a Na-ion battery, Angew. Chem. Int. Ed., 52(2013)1964-1967.

A. Eftekhari, Potassium secondary cell based on Prussian blue cathode, J.Power Sources, 126 (2004) 221-228.

C.D. Wessells, R.A. Huggins, Y. Cui, Copper hexacyanoferrate battery electrodes with long cycle life and high power, Nature Communication, 2( 2011) 550.

C.D. Wessells et al., Nickel hexacyanoferrate nanoparticle electrodes for aqueous sodium and potassium ion batteries, Nano Lettetter, 11(2011) 5421-5425.

C.D. Wessells et al., The effect of insertion species on nanostructured open framework hexacyanoferrate battery electrode, J. Electrochem. Soc., 159(2012) A98-A103.

T.Matsuda, M. Takachi, Y. Moritomo, A sodium manganese ferrocyanide thin film for Na-ion batteries, Chemical Communications, DOI: 10.1039/C3CC38839E.

S.-H. Yu et al., Iron hexacyanoferrate nanoparticles as cathode materials for lithium and sodium rechargeable batteries, ECS Electrochemistry Letters, 2(2013)A39-A41.

\* cited by examiner

METAL-DOPED TRANSITION METAL HEXACYANOFERRATE (TMHCF) BATTERY ELECTRODE

RELATED APPLICATIONS

This application is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

BACKGROUND OF THE INVENTION

1. Field of the Invention

This invention generally relates to electrochemical cells and, more particularly, to a metal-doped transition-metal hexacyanoferrate (TMHCF) battery electrode, and associated fabrication processes.

2. Description of the Related Art

A battery is an electrochemical cell through which chemical energy and electric energy can be converted back and forth. The energy density of a battery is determined by its voltage and charge capacity. Lithium has the most negative potential of −3.04 V vs. $H_2/H^+$, and has the highest gravimetric capacity of 3860 milliamp-hours per gram (mAh/g). Due to their high energy densities, lithium-ion batteries have led the portable electronics revolution. However, the high cost of lithium metal renders doubtful the commercialization of lithium batteries as large scale energy storage devices. Further, the demand for lithium and its reserve as a mineral have raised the need to build other types metal-ion batteries as an alternative.

Lithium-ion (Li-ion) batteries employ lithium storage compounds as the positive (cathode) and negative (anode) electrode materials. As a battery is cycled, lithium ions ($Li^+$) are exchanged between the positive and negative electrodes. Li-ion batteries have been referred to as rocking chair batteries because the lithium ions "rock" back and forth between the positive and negative electrodes as the cells are charged and discharged. The positive electrode (cathode) material is typically a metal oxide with a layered structure, such as lithium cobalt oxide ($LiCoO_2$), or a material having a tunneled structure, such as lithium manganese oxide ($LiMn_2O_4$), on an aluminum current collector. The negative electrode (anode) material is typically a graphitic carbon, also a layered material, on a copper current collector. In the charge-discharge process, lithium ions are inserted into, or extracted from interstitial spaces of the active materials.

Similar to the lithium-ion batteries, metal-ion batteries use the metal-ion host compounds as their electrode materials in which metal-ions can move easily and reversibly. As for a $Li^+$-ion, it has one of the smallest radii of all metal ions and is compatible with the interstitial spaces of many materials, such as the layered $LiCoO_2$, olivine-structured $LiFePO_4$, spinel-structured $LiMn_2O_4$, and so on. Other metal ions, such as $Na^+$, $K^+$, $Mg^{2+}$, $Al^{3+}$, $Zn^{2+}$, etc., with large sizes, severely distort Li-based intercalation compounds and ruin their structures in several charge/discharge cycles. Therefore, new materials with large interstitial spaces would have to be used to host such metal-ions in a metal-ion battery.

Figure 1:
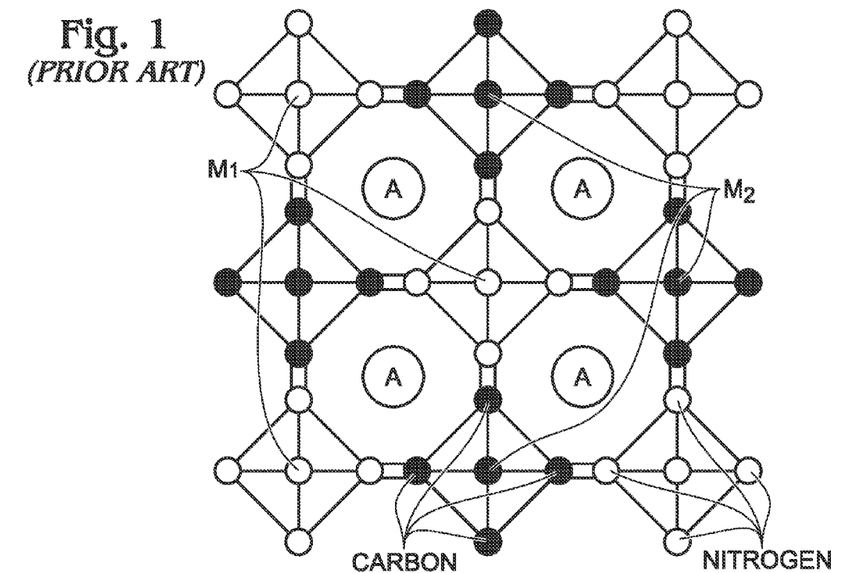
FIG. 1 is a diagram depicting the crystal structure of a transition metal hexacyanoferrate (TMHCF) in the form of $A_xM1M2(CN)_6$ (prior art).

FIG. 1 is a diagram depicting the crystal structure of a transition metal hexacyanoferrate (TMHCF) in the form of $A_xM1M2(CN)_6$ (prior art). TMHCF with large interstitial spaces has been investigated as a cathode material for rechargeable lithium-ion batteries [1,2], sodium-ion batteries [3,4], and potassium-ion batteries [5]. With an aqueous electrolyte containing the proper alkali-ions or ammonium-ions, copper and nickel hexacyanoferrates ((Cu,Ni)-HCFs) exhibited a very good cycling life with 83% capacity retained after 40,000 cycles at a charge/discharge rate of 17 C [6-8]. However, the materials demonstrated low capacities and energy densities because: (1) just one sodium-ion can be inserted/extracted into/from each Cu-HCF or Ni-HCF molecule, and (2) these TMHCF electrodes must be operated below 1.23 V due to the water electrochemical window. To correct these shortcomings, manganese hexacyanoferrate (Mn-HCF) and iron hexacyanoferrate (Fe-HCF) have been used as cathode materials in non-aqueous electrolyte [9, 10]. Assembled with a sodium-metal anode, the Mn-HCF and Fe-HCF electrodes cycled between 2.0 V and 4.2 V and delivered a capacity of about 110 mAh/g.

TMHCF has two main disadvantages as an electrode material in rechargeable batteries with a non-aqueous electrolyte. One is that water molecules reside in the larger interstitial spaces of TMHCF. The other is its low electronic conductivity.

In TMHCF, interstitial water demonstrates a complicated behavior. On one hand, interstitial water supports the TMHCF framework and stabilizes its structure. On the other hand, when TMHCF is used in rechargeable batteries with a non-aqueous electrolyte, the interstitial water promotes adverse effects on TMHCF performance. In general, non-aqueous electrolyte rechargeable batteries work at high voltage ranges that are beyond the water decomposition voltage. In TMHCF batteries, the interstitial water decomposes at the high operation voltage. The disappearance of interstitial water makes the TMHCF framework unstable, which shortens the capacity retention of TMHCF electrodes. The interstitial spaces of the TMHCF occupied by water molecules reduce the concentration of movable ions in the interstitial spaces, which leads to the small capacity of TMHCF electrodes during charge/discharge. For example, the nominal formula of sodium Mn-HCF is $Na_2MnFe(CN)_6$. But due to the interstitial water molecules, just 1.32 sodium-ions exist in one Mn-HCF molecule. Its maximum capacity was measured to 112 mAh/g [9].

The general formula of TMHCF can be expressed as $A_xM_y\cdot Fe_z(CN)_n\cdot mH_2O$, in which "A" is alkali-ion or alkaline-ion, and "M" indicates one of several transition metals. During charge/discharge, the following reaction takes place:

$$A_xM_yFe_z(CN)_n\cdot mH_2O \leftrightarrow xA^{a+} + [M_yFe_z(CN)_n\cdot mH_2O]^{xa-} + xae^-.$$

In terms of the reaction, the performance of the TMHCF electrode is determined by how fast A-ions and electrons transport in the TMHCF framework. However, electron transfer is difficult along the Fe—C≡N-M structure. In other words, TMHCF has a low electronic conductivity. Therefore, TMHCF electrodes exhibit poor performance when a high charge/discharge current is exerted onto the batteries.

It would be advantageous if TMHCF could be doped with metal ions to improve its performance as a rechargeable battery electrode, to increase capacity and lengthening cycling life.

[1] V. D. Neff, Some performance characteristics of a Prussian Blue battery, Journal of Electrochemical Society, 132 (1985) 1382-1384.

[2] N. Imanishi, T. Morikawa, J. Kondo, Y. Takeda, O. Yamamoto, N. Kinugasa, T. Yamagishi, Lithium intercalation behavior into iron cyanide complex as positive electrode of lithium secondary battery, Journal of Power Sources, 79 (1999) 215-219.

[3] Y. Lu, L. Wang, J. Cheng, J. B. Goodenough, Prussian blue: a new framework for sodium batteries, Chemistry Communication, 48 (2012) 6544-6546.

[4] L. Wang, Y. Lu, J. Liu, M. Xu, J. Cheng, D. Zhang, J. B. Goodenough, A superior low-cost cathode for a Na-ion battery, Angew. Chem. Int. Ed., 52 (2013) 1964-1967.

[5] A. Eftekhari, Potassium secondary cell based on Prussian blue cathode, J. Power Sources, 126 (2004) 221-228.

[6] C. D. Wessells, R. A. Huggins, Y. Cui, Copper hexacyanoferrate battery electrodes with long cycle life and high power, Nature Communication, 2 (2011) 550.

[7] C. D. Wessells, S. V. Peddada, R. A. Huggins, Y. Cui, Nickel hexacyanoferrate nanoparticle electrodes for aqueous sodium and potassium ion batteries. Nano Letters, 11 (2011) 5421-5425.

[8] C. D. Wessells, S. V. Peddada, M. T. McDowell, R. A. Huggins, Y. Cui, The effect of insertion species on nanostructured open framework hexacyanoferrate battery electrode, J. Electrochem. Soc., 159 (2012) A98-A103.

[9] T. Matsuda, M. Takachi, Y. Moritomo, A sodium manganese ferrocyanide thin film for Na-ion batteries, Chemical Communications, DOI: 10.1039/C3CC38839E.

[10] S.-H. Yu, M. Shokouhimehr, T. Hyeon, Y.-E. Sung, Iron hexacyanoferrate nanoparticles as cathode materials for lithium and sodium rechargeable batteries, ECS Electrochemistry Letters, 2 (2013) A39-A41.

SUMMARY OF THE INVENTION

Disclosed herein is a means of improving the performance of transition metal hexacyanoferrate (TMHCF) electrodes in rechargeable batteries by doping with metal ions. The metal ion doping stabilizes the framework of TMHCF and improves electron transport. The metal-doped TMHCF electrodes demonstrate high capacity, long cycling life, and fast electron/ion transport.

TMHCF, expressed as $A_xM_yFe_z(CN)_n\cdot mH_2O$, may be used as an electrode in rechargeable batteries with a non-aqueous electrolyte. "A" can be selected from alkali or alkaline metals, with x less than or equal to 2, and where M can be one of several transition metals. As disclosed herein, metal ions are doped to the structure of TMHFC. The doping ions can be one of many metal ions, or even ammonium-ions. The content of doping ions can be from 0 to 90% of the TMHCF. The doping ions can occupy the "M" positions in the framework or "A" positions in the interstitial spaces of the TMHCF framework.

Accordingly, a method is provided for synthesizing a metal-doped battery electrode. The method prepares a first solution of $A_xFe(CN)_6$ and $Fe(CN)_6$, where A cations may be alkali or alkaline-earth cations, and x is less than or equal to 2. The method adds the first solution to a second solution containing M-ions and M'-ions, forming a mixture. M is a transition metal, and M' is a metal dopant. Subsequent to stirring, the mixture is precipitated to form $A_xM_cM'_dFe_z(CN)_n\cdot mH_2O$ particles, where n is in the range of 1 to 6, m is in the range of 0 to 7, d is less than or equal to 1, c is less than or equal to 2, and z is in the range of 0.1 to 2. The $A_xM_cM'_dFe_z(CN)_n\cdot mH_2O$ particles have a framework and interstitial spaces in the framework, where M and M' occupy positions in the framework.

Alternatively, the method prepares a first solution of $A_xFe(CN)_6$ and $Fe(CN)_6$, as described above, and adds the first solution to a second solution containing M-ions. The method adds A'-ions to the first solution, the second solution, or both the first and second solutions, forming a mixture. A' is a metal dopant. Subsequent to stirring, the mixture is precipitated to form $A_aA'_bM_yFe_z(CN)_n\cdot mH_2O$ particles, where n is in the range of 1 to 6, y is less than or equal to 2, z is in the range of 0.1 to 2, m is in the range of 0 to 7, b is less than or equal to 1, and a is less than or equal to 2. A and A' occupy interstitial spaces in the $A_aA'_bM_yFe_z(CN)_n\cdot mH_2O$ particle framework.

Additional details of the above-described methods and a metal-doped TMHCF electrode are presented below.

DETAILED DESCRIPTION

Figure 2A:
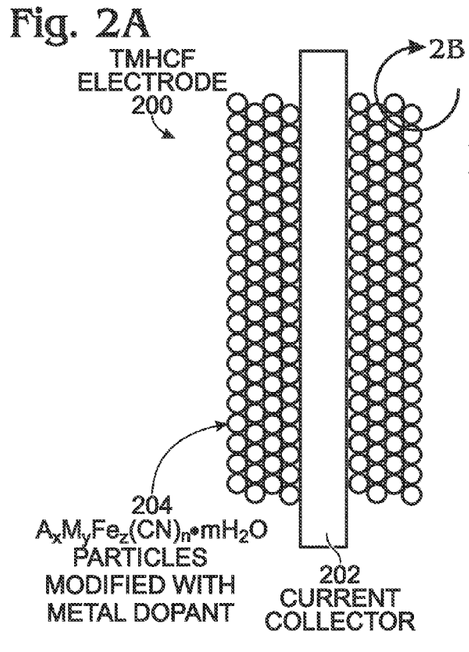
FIGS. 2A and 2B are, respectively, a partial cross-sectional diagram of a metal-doped transition metal hexacyanoferrate (TMHCF) battery electrode and a detailed view of a metal-doped TMHCF particle.
Figure 2B:
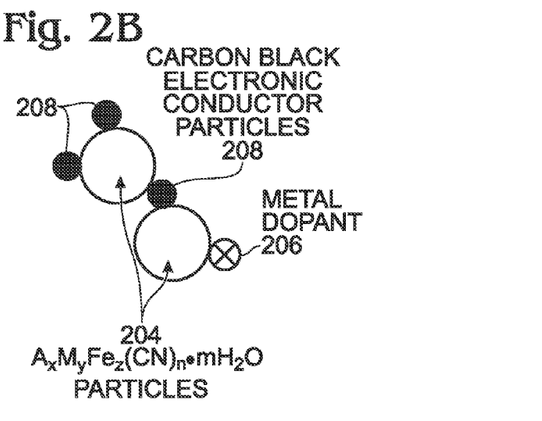

FIGS. 2A and 2B are, respectively, a partial cross-sectional diagram of a metal-doped transition metal hexacyanoferrate (TMHCF) battery electrode and a detailed view of a metal-doped TMHCF particle. As shown in FIG. 2A, the electrode 200 comprises a metal current collector 202. $A_xM_yFe_z(CN)_n \cdot mH_2O$ particles 204 overlie the current collector 202.

The A cations are either alkali or alkaline-earth cations;
M is a transition metal;
x is less than or equal to 2;
y is less than or equal to 2;
z is in the range of 0.1 to 2;
n is in the range of 1 to 6; and,
m is in the range of 0 to 7.

As shown more explicitly in FIG. 2B, a metal dopant 206 modifies the $A_xM_yFe_z(CN)_n \cdot mH_2O$ particles 204. In some aspects, the electrode 200 further comprises carbon black conductor particles 208. The metal dopant modified $A_xM_yFe_z(CN)_n \cdot mH_2O$ particles 204 have a greater electrical conductivity and longer cycling life than $A_xM_yFe_z(CN)_n \cdot mH_2O$ particles.

Some examples of A cations include lithium (Li), sodium (Na), potassium (K), rubidium (Rb), caesium (Cs), calcium (Ca), and magnesium (Mg). Some examples of transition metal M (M-ions) include titanium (Ti), vanadium (V), chromium (Cr), manganese (Mn) iron (Fe), cobalt (Co), nickel (Ni), copper (Cu), zinc (Zn), niobium (Nb), ruthenium (Ru), tin (Sn), indium (In), and cadmium (Cd).

The metal dopant modified the $A_xM_yFe_z(CN)_n \cdot mH_2O$ particles form either $A_aA'_bM_yFe_z(CN)_n \cdot M'H_2O$ or $A_cM_yM'_dFe_z(CN)_n \cdot M'H_2O$, where A' and M' are metal dopants.

Figure 3:
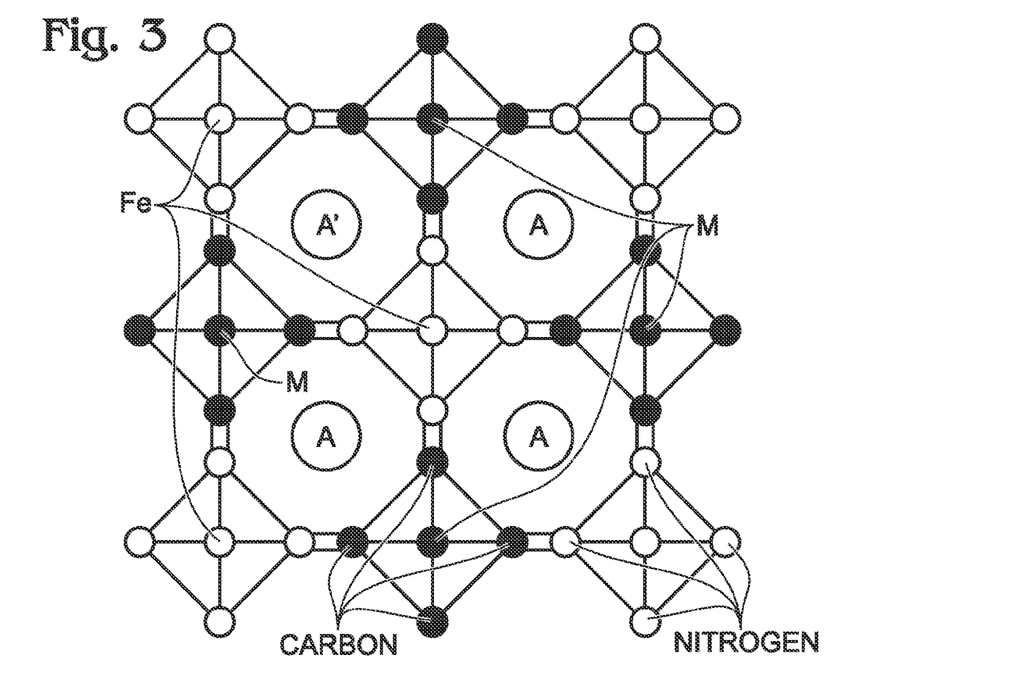
FIG. 3 is a schematic diagram depicting the framework of a metal-doped TMHCF particle.

FIG. 3 is a schematic diagram depicting the framework of a metal-doped TMHCF particle. In one aspect the metal-dopant modified $A_xM_yFe_z(CN)_n \cdot mH_2O$ particles form $A_aA'_bM_yFe_z(CN)_n \cdot mH_2O$ particles having a framework and interstitial spaces in the framework;

where A' is a metal dopant;
where A and A' occupy interstitial spaces;
where b is less than or equal to 1; and,
where "a" is less than or equal to 2.

In this aspect, the A' metal dopant is a material other than A. Some examples of the A' metal dopant include ammonium-ions ($NH_4^+$), Li, Na, K, Rb, Cs, Ca, and Mg.

Figure 4:
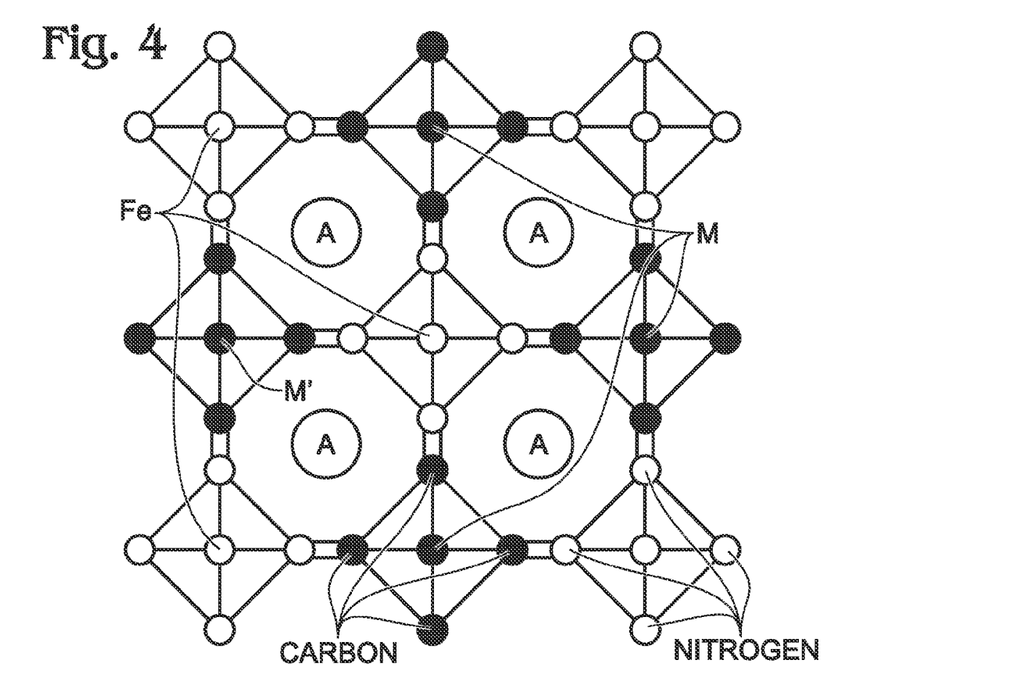
FIG. 4 is a schematic diagram depicting the framework of a metal-doped TMHCF particle variation.

FIG. 4 is a schematic diagram depicting the framework of a metal-doped TMHCF particle variation. In one aspect, the metal dopant modifies the $A_xM_yFe_z(CN)_n \cdot mH_2O$ particles to form $A_xM_cM'_dFe_z(CN)_n \cdot mH_2O$ particles having a framework and interstitial spaces in the framework;

where M' is a metal dopant;
where M and M' occupy positions in the framework;
where d is less than or equal to 1; and,
where c is less than or equal to 2.

The M' metal dopant is a material other than M. Some examples of the M' metal dopant include Ti, V, Cr, Mn, Fe, Co, Ni, Cu, Zn, Nb, Ru, Sn, In, and Cd.

Although not explicitly shown, the electrode of FIG. 2A may be used as the cathode in a rechargeable battery including an anode made with alkali or alkaline-earth cations, and an electrolyte that includes alkali or alkaline-earth cations. For example, see the description of FIG. 3 in parent application Ser. No. 13/897,492.

The metal ions used for doping can be any metal listed in element periodic table and may also be ammonium-ions ($NH_4^+$). Specific examples of metal ions are listed above. The doping metal ions play at least five roles in improving TMHCF performance, as follows: (1) reducing the content of interstitial water, (2) stabilizing the TMHCF frameworks, (3) increasing TMHCF capacity, (4) changing the electronic structures of TMHCF to increase their electronic conductivity, and (5) improving ions transport in the TMHCF framework.

As noted above, the general formula of TMHCF can be expressed as $A_xM_yFe_z(CN)_n \cdot mH_2O$, in which "A" is alkali-ion or alkaline-ion, and "M" indicates one of several transition metals. The metal ions can be doped into the "M" positions to form $A_xM_cM'_dFe_z(CN)_n \cdot mH_2O$ in which M' indicates one of several doping ions, with d being less than or equal to one, and c being less than or equal to 2. The metal ions can also substitute "A" positions to obtain $A_aA'_bM_yFe_z(CN)_n \cdot mH_2O$ in which A' indicates one of several doping ions, with b being less than or equal to 1, and "a" being less than or equal to 2.

The synthesis of metal-ion doped TMHCF can be carried out with a co-precipitation method. Conventionally (without metal-ion doping), the synthesis of TMHCF can be briefly described as follows. A first solution (Solution 1) of ferricyanides or ferrocyanides, $A_xFe(CN)_6$, with a concentration of 0.001 moles (M)-2 M mixes with the second solution (Solution 2) containing M-ions with a concentration of 0.001 M-10M. Solution 1 may be dropped into Solution 2, Solution 2 may be dropped into Solution 1, Solution 1 and Solution 2 may be dropped into water or other solutions simultaneously. The mixture is typically stirred, for example magnetically or ultrasonically, washed in deionized water (DI), and dried.

As for "M"-site doping in the TMHCF, the doping ions, M', are dissolved into Solution 2 in a certain concentration. Solution 1 and Solution 2 are mixed together in the process mentioned above to obtain M'-ion doped TMHCF, $A_xM_cM'_dFe_z(CN)_n \cdot mH_2O$. When doping metal ions are substituted for "A" in the TMHCF, salts containing A'-ions are dissolved into either Solution 1 or Solution 2, or both of them. After Solution 1 and Solution 2 are mixed together, A'-ions doped TMHCF, $A_xA'_xM_yFe_z(CN)_n \cdot mH_2O$, is synthesized.

Two examples are presented herein. One is that of 5% $Mn^{2+}$-site in $Na_xMnFe(CN)_6 \cdot mH_2O$ (Mn-HCF), where $Al^{3+}$-ions are substituted for Na to form $Na_{x-0.05}Mn_{0.95}Al_{0.05}Fe(CN)_6 \cdot mH_2O$ ($Al_{0.05}Mn_{0.95}$-HCF). The second example uses $K^+$-ions to replace $Na^+$-ions in $Na_xMnFe(CN)_6 \cdot mH_2O$ to obtain $Na_xK_x\cdot MnFe(CN)_6 \cdot m"H_2O$ (NaKMn-HCF).

Example One $Al_{0.05}Mn_{0.95}$-HCF

Solution 1 was a $Na_4Fe(CN)_6$ water solution. Solution 2 included the $Mn^{2+}$ and $Al^{3+}$-ions. Solution 2 was dropped into Solution 1 slowly to form the precipitation of $Al_{0.05}Mn_{0.95}$-HCF. After separation, washing, and drying, $Al_{0.05}Mn_{0.95}$-HCF was used as an electrode in sodium-ion batteries with an electrolyte of saturated $NaClO_4$ ethylene carbonate/diethylene carbonate (EC/DEC). For the purpose of comparison, Mn-HCF was synthesized under the same conditions.

Figure 5A:
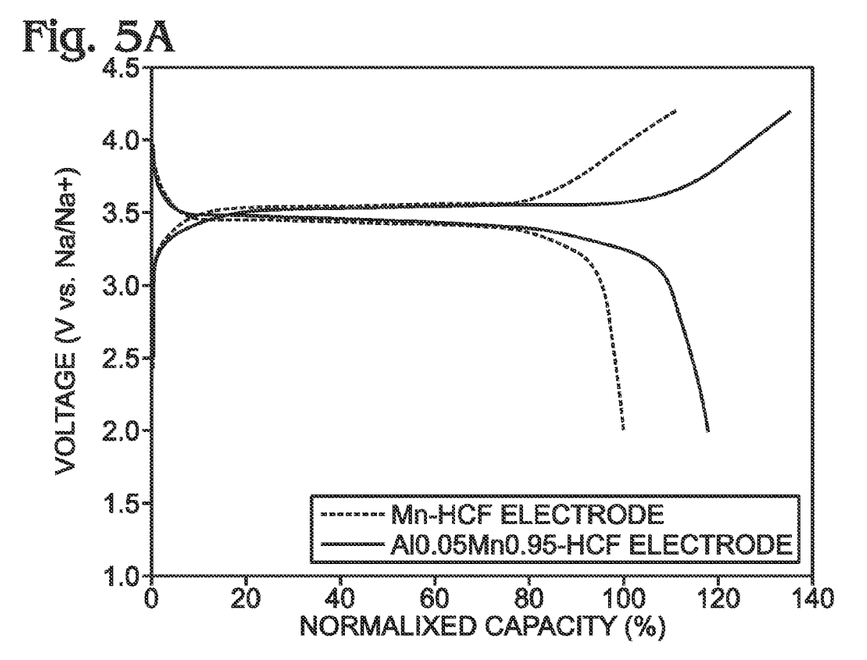
FIGS. 5A and 5B are graphs comparing an aluminum-doped Mn-HCF ($Al_{0.05}Mn_{0.95}$-HCF) electrode to a Mn-HCF (undoped) electrode.
Figure 5B:
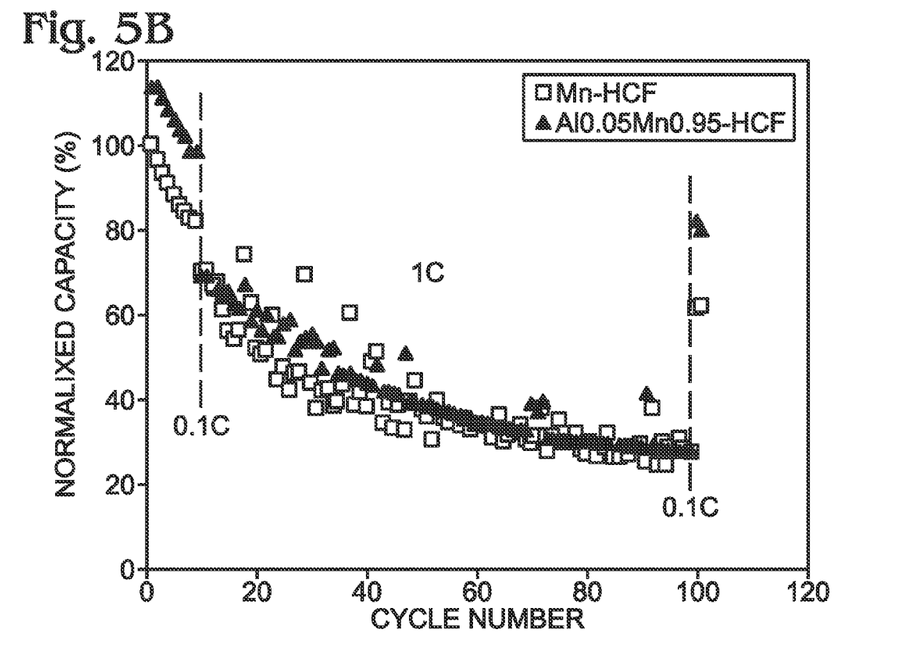

FIGS. 5A and 5B are graphs comparing an aluminum-doped Mn-HCF ($Al_{0.05}Mn_{0.95}$-HCF) electrode to a Mn-HCF (undoped) electrode. The capacities were normalized by the maximum capacity of the Mn-HCF electrode during the first discharge. FIG. 5A depicts a comparison of the charge/discharge profiles of Mn-HCF and $Al_{0.05}Mn_{0.95}$-HCF electrodes after the first cycle. The doping with $Al^{3+}$-ions increases the capacity of Mn-HCF electrode by about 15%. The electrodes were then cycled with currents of 0.1 C and 1 C. After 100 cycles, the current reverted back to 0.1 C. The normalized capacity of $Al_{0.05}Mn_{0.95}$-HCF electrode was about 20% higher than that of Mn-HCF electrode, as shown in FIG. 5B. The $Al^{3+}$-ion size is smaller than the $Mn^{2+}$-ion. The doping $Al^{3+}$-ions shrink the Mn-HCF lattice parameters, which stabilize its structure and suppress the occupation of water molecules in the interstitial spaces. Therefore, the $Al^{3+}$-ion doped Mn-HCF demonstrated higher capacity and better capacity retention.

Example Two

NaKMn-HCF

Solution 1 contained $Na_4Fe(CN)_6$ and $K_4Fe(CN)_6$. Solution 2 was a $Mn^{2+}$ solution. Solution 1 and Solution 2 were mixed together to obtain NaKMn-HCF. For the purpose of comparison, Mn-HCF was synthesized under the same conditions. NaKMn-HCF was evaluated as an electrode in sodium-ion batteries with an electrolyte of saturated $NaClO_4$ ethylene carbonate/diethylene carbonate (EC/DEC).

Figure 6:
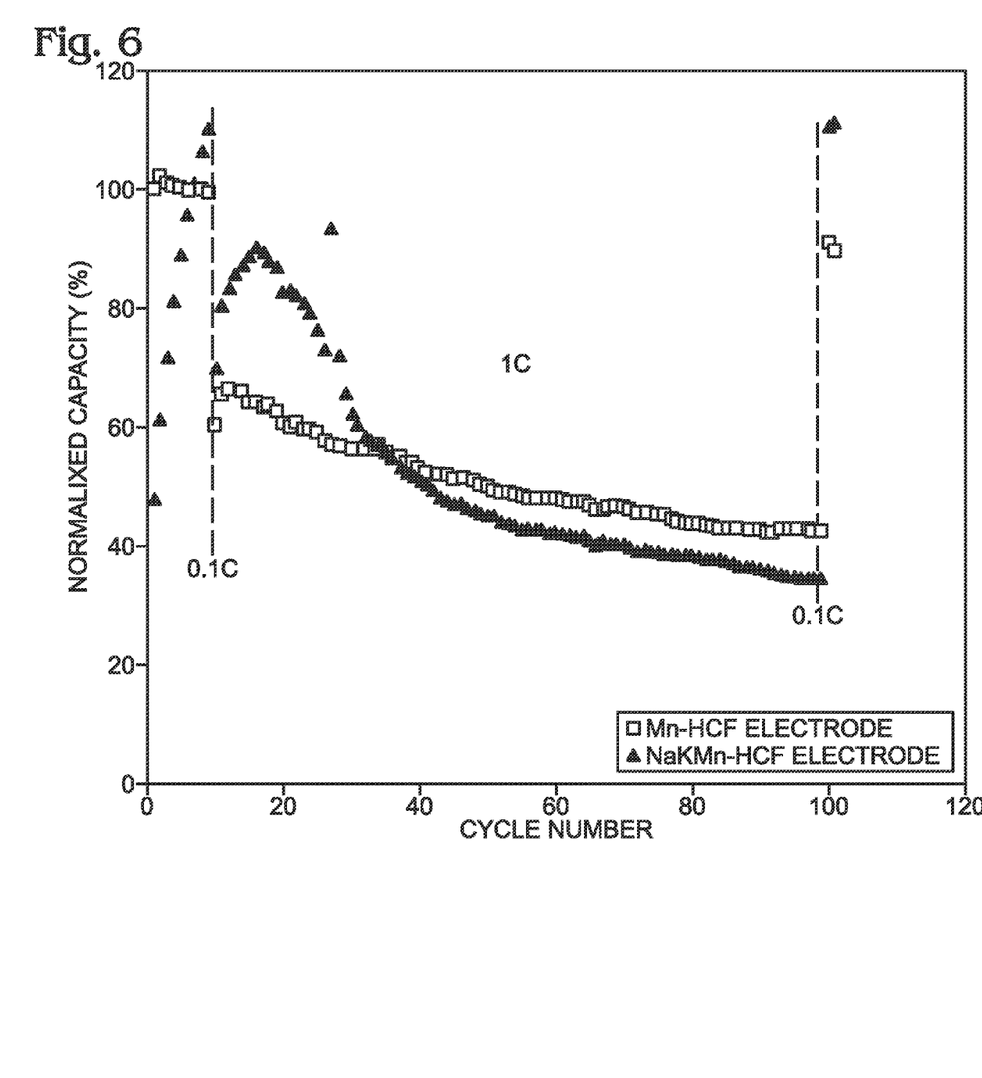
FIG. 6 is a graph depicting the capacity changes of Mn-HCF and NaKMn-HCF electrodes with cycling at different charge/discharge currents.

FIG. 6 is a graph depicting the capacity changes of Mn-HCF and NaKMn-HCF electrodes with cycling at different charge/discharge currents. Although the capacity of NaKMn-HCF was lower than that of Mn-HCF during initial cycles, it exhibited a better capacity retention. After 100 cycles, the normalized capacity of KNaMn-HCF was 111%, but that of Mn-HCF was 91% with a current of 0.1 C. In other words, the capacity retention increased 20% due to $K^+$-ions doping. $K^+$-ions are larger than $Na^+$-ions, which supports the Mn-HCF structure and stabilizes it during charge/discharge cycling.

Figure 7:
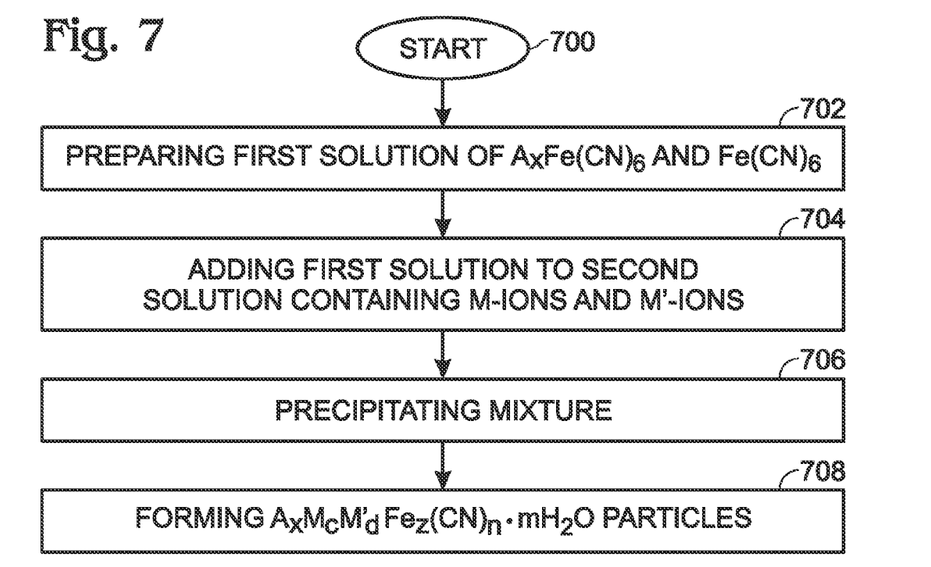
FIG. 7 is a flowchart illustrating a method for synthesizing a metal-doped TMHCF battery electrode.

FIG. 7 is a flowchart illustrating a method a metal-doped TMHCF battery electrode. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 700.

Step 702 prepares a first solution of $A_xFe(CN)_6$ and $Fe(CN)_6$, where A cations are either alkali or alkaline-earth cations, and x is less than or equal to 2. Some examples of A cations include lithium (Li), sodium (Na), potassium (K), rubidium (Rb), caesium (Cs), calcium (Ca), and magnesium (Mg). $Fe(CN)_6$ may be either in the form of ferrocyanide ($[Fe(CN)_6]^{4-}$) or ferricyanide ($[Fe(CN)_6]^{3-}$). Step 704 adds the first solution to a second solution containing M-ions and M'-ions, forming a mixture. M is a transition metal and M' is a metal dopant. The M' metal dopant is a material other than M, such as titanium (Ti), vanadium (V), chromium (Cr), manganese (Mn), iron (Fe), cobalt (Co), nickel (Ni), copper (Cu), zinc (Zn), niobium (Nb), ruthenium (Ru), tin (Sn), indium (In), and cadmium (Cd). M is selected from the same group of transition metals as M'.

Subsequent to stirring, Step 706 precipitates the mixture. Step 708 forms $A_xM_cM'_dFe_z(CN)_n \cdot mH_2O$ particles, where:
   n is in the range of 1 to 6;
   m is in the range of 0 to 7;
   d is less than or equal to 1;
   c is less than or equal to 2; and,
   z is in the range of 0.1 to 2.

The $A_xM_cM'_dFe_z(CN)_n \cdot mH_2O$ particles formed in Step 708 have a framework and interstitial spaces in the framework, where M and M' occupy positions in the framework.

In one aspect, preparing the first solution of $A_xFe(CN)_6$ and $Fe(CN)_6$ in Step 702 includes the $A_xFe(CN)_6$ having a molar concentration in the range of 0.001 moles (M) to 2 M. Adding the first solution to the second solution containing M-ions and M'-ions in Step 704 includes the M-ions having a molar concentration in a range of 0.001 M to 10 M.

It should be understood that the $A_xM_cM'_dFe_z(CN)_n \cdot mH_2O$ particles, in the form of a dried powder, may be mixed with a conducting carbon and an organic binder in an organic solution, creating a mixture or paste that may be applied to a current collector and dried to form an electrode.

Figure 8:
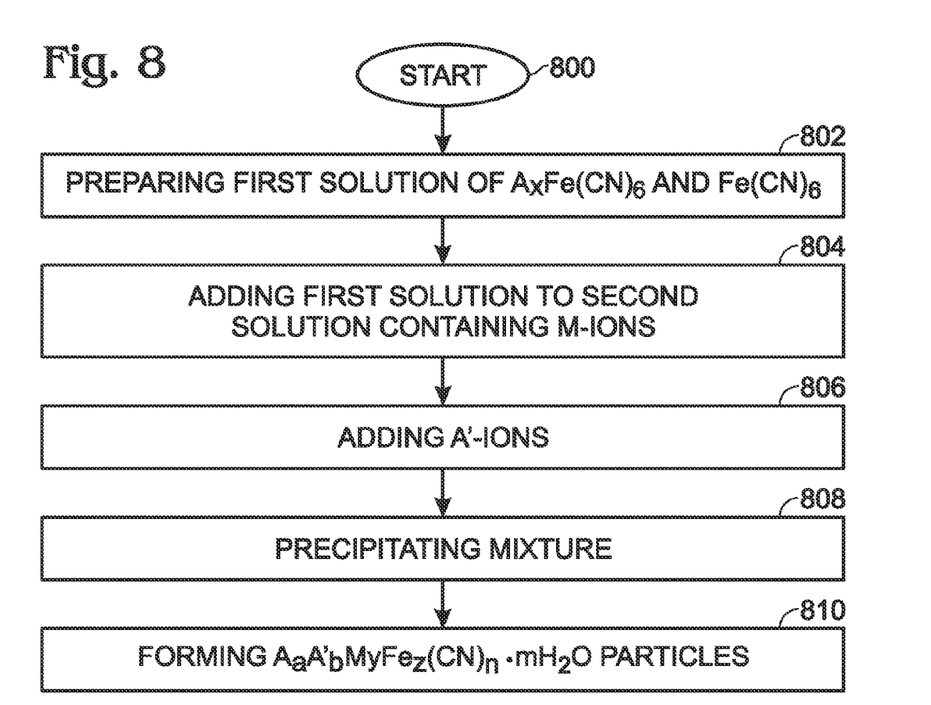
FIG. 8 is a flowchart illustrating another method for synthesizing a metal-doped TMHCF battery electrode.

FIG. 8 is a flowchart illustrating another method for synthesizing a metal-doped TMHCF battery electrode. The method begins at Step 800. Step 802 prepares a first solution of $A_xFe(CN)_6$ and $Fe(CN)_6$, where A cations are either alkali or alkaline-earth cations, and x is less than or equal to 2. Some examples of A cations include lithium (Li), sodium (Na), potassium (K), rubidium (Rb), caesium (Cs), calcium (Ca), and magnesium (Mg). $Fe(CN)_6$ may be either ferrocyanide ($[Fe(CN)_6]^{4-}$) or ferricyanide ($[Fe(CN)_6]^{3-}$). Step 804 adds the first solution to a second solution containing M-ions, where M is a transition metal. The M-ions may, for example, be titanium (Ti), vanadium (V), chromium (Cr), manganese (Mn) iron (Fe), cobalt (Co), nickel (Ni), copper (Cu), zinc (Zn), niobium (Nb), ruthenium (Ru), tin (Sn), indium (In), or cadmium (Cd).

Step 806 adds A'-ions the first solution, the second solution, or both the first and second solutions, forming a mixture. A' is a metal dopant. More explicitly, the A' metal dopant is a material other than A, such as ammonium-ions ($NH_4^+$), Li, Na, K, Rb, Cs, Ca, or Mg. Subsequent to stirring, Step 808 precipitates the mixture. Step 810 forms $A_aA'_bM_yFe_z(CN)_n \cdot mH_2O$ particles, where:
   n is in the range of 1 to 6;
   y is less than or equal to 2;
   z is in the range of 0.1 to 2;
   m is in the range of 0 to 7;
   b is less than or equal to 1; and,
   "a" is less than or equal to 2.

The $A_aA'_bM_yFe_z(CN)_n \cdot mH_2O$ particles formed in Step 810 have a framework and interstitial spaces in the framework, where A and A' occupy interstitial spaces.

In one aspect, preparing the first solution of $A_xFe(CN)_6$ and $Fe(CN)_6$ in Step 802 includes the $A_xFe(CN)_6$ having a molar concentration in a range of 0.001 moles (M) to 2 M. Adding the first solution to the second solution containing M-ions in Step 804 includes the M-ions having a molar concentration in a range of 0.001 M to 10 M.

The $A_aA'_bM_yFe_z(CN)_n \cdot mH_2O$ particles, in the form of a dried powder, may be mixed with a conducting carbon and an organic binder in an organic solution, creating a mixture or paste that may be applied to a current collector and dried to form an electrode.

A metal-doped TMHCF electrode and associated fabrication methods have been provided. Examples of particular materials and process steps have been presented to illustrate the invention. However, the invention is not limited to merely these examples. Other variations and embodiments of the invention will occur to those skilled in the art.

We claim:

1. A metal-doped transition metal hexacyanoferrate (TMHCF) battery electrode, prior to assembly in a battery and being subjected to charge/discharge cycling, the electrode comprising;
   a metal current collector;
   $A_xM_yFe_z(CN)_n \cdot mH_2O$ particles overlying the current collector;
      where A cations are selected from a group consisting of alkali and alkaline-earth cations;
      where M is a transition metal;
      where x is less than or equal to 2;
      where y is less than or equal to 2;
      where z is in a range of 0.1 to 2;

where n is in a range of 1 to 6;
where m is in a range of 0 to 7; and,
a metal dopant modifying the $A_xM_yFe_z(CN)_n \cdot mH_2O$ particles to form particles, having a framework and interstitial spaces in the framework, selected from a group consisting of $A_aA'_bM_yFe_z(CN)_n \cdot mH_2O$ and $A_cMyM'_d(CN)_n \cdot mH_2O$,
where A' and M' are metal dopants;
where A and A' occupy interstitial spaces;
where b is less than or equal to 1;
where "a" is less than or equal to 2;
where M and M' occupy positions in the framework;
where d is less than or equal to 1; and,
where c is less than or equal to 2.

2. The TMHCF battery electrode of claim 1 wherein the A cations are selected from a group consisting of lithium (Li), sodium (Na), potassium (K), rubidium (Rb), caesium (Cs), calcium (Ca), and magnesium (Mg).

3. The TMHCF battery electrode of claim 1 wherein transition metal M is selected from a group consisting of titanium (Ti), vanadium (V), chromium (Cr), manganese (Mn), iron (Fe), cobalt (Co), nickel (Ni), copper (Cu), zinc (Zn), niobium (Nb), ruthenium (Ru), tin (Sn), indium (In), and cadmium (Cd).

4. The TMHCF battery electrode of claim 1 wherein the A' metal dopant is a material other than A, selected from a group consisting of ammonium-ions ($NH_4^+$), Li, Na, K, Rh, Cs, Ca, and Mg.

5. The TMHCF battery electrode of claim 1 wherein the M' metal dopant is a material other than M, selected from a group consisting of Ti, V, Cr, Mn, Fe, Co, Ni, Cu, Zn, Nb, Ru, Sn, In, and Cd.

6. The TMHCF battery electrode of claim 1 wherein the metal dopant modified $A_xM_yFe_z(CN)_n \cdot mH_2O$ particles have a greater electrical conductivity and longer cycling life than $A_xM_yFe_z(CN)_n \cdot mH_2O$ particles.

7. A method for synthesizing a metal-doped transition metal hexacyanoferrate (TMHCF) battery electrode, the method comprising:
preparing a first solution of $A_xFe(CN)_6$ and $Fe(CN)_6$;
where A cations are selected from a group consisting of alkali and alkaline-earth cations;
where x is less than or equal to 2;
adding the first solution to a second solution containing M-ions and M'-ions, forming a mixture;
where M is a transition metal;
where M' is a metal dopant;
subsequent to stirring, precipitating the mixture;
forming $A_xM_cM'_dFe_z(CN)_n \cdot mH_2O$ particles;
where n is in a range of 1 to 6;
where m is in a range of 0 to 7;
where d is less than or equal to 1;
where c is less than or equal to 2; and,
where z is in a range of 0.1 to 2.

8. The method of claim 7 wherein forming $A_xM_cM'_dFe_z(CN)_n \cdot mH_2O$ particles includes forming $A_xM_cM'_dFe_z(CN)_n \cdot mH_2O$ particles having a framework and interstitial spaces in the framework, where M and M' occupy positions in the framework.

9. The method of claim 7 wherein adding the first solution to the second solution containing M-ions and M'-ions includes the M' metal dopant being a material other than M, selected from a group consisting of titanium (Ti), vanadium (V), chromium (Cr), manganese (Mn), iron (Fe), cobalt (Co), nickel (Ni), copper (Cu), zinc (Zn), niobium (Nb), ruthenium (Ru), tin (Sn), indium (In), and cadmium (Cd).

10. The method of claim 7 wherein preparing the first solution of $A_xFe(CN)_6$ and $Fe(CN)_6$ includes the A cations being selected from a group consisting of lithium (Li), sodium (Na), potassium (K), rubidium (Rb), caesium (Cs), calcium (Ca), and magnesium (Mg).

11. The method of claim 7 wherein adding the first solution to the second solution containing M-ions and M'-ions includes the M-ions being selected from a group consisting of Ti, V, Cr, Mn, Fe, Co, Ni, Cu, Zn, Nb, Ru, Sn, In, and Cd.

12. The method of claim 7 wherein preparing the first solution of $A_xFe(CN)_6$ and $Fe(CN)_6$ includes the $Fe(CN)_6$ being a material selected from a group consisting of ferrocyanide ($[Fe(CN)_6]^{4-}$) and ferricyanide ($[Fe(CN)_6]^{3-}$).

13. The method of claim 7 wherein preparing the first solution of $A_xFe(CN)_6$ and $Fe(CN)_6$ includes the $A_xFe(CN)_6$ having a molar concentration in a range of 0.001 moles (M) to 2 M; and,
wherein adding the first solution to the second solution containing M-ions and M'-ions includes the Ni-ions having a molar concentration in a range of 0.001 M to 10 M.

14. A method for synthesizing a metal-doped transition metal hexacyanoferrate (TMHCF) battery electrode, the method comprising:
preparing a first solution of $A_xFe(CN)_6$ and $Fe(CN)_6$,
where A cations are selected from a group consisting of alkali and alkaline-earth cations;
where x is less than or equal to 2;
adding the first solution to a second solution containing M-ions, where M is a transition metal;
adding A'-ions to a solution selected from a group consisting of the first solution, the second solution, and both the first and second solutions, forming a mixture, where A' is a metal dopant;
subsequent to stirring, precipitating the mixture;
forming $A_aA'_bM_yFe_z(CN)_n \cdot mH_2O$ particles;
where n is in a range of 1 to 6;
where y is less than or equal to 2;
where z is in a range of 0.1 to 2;
where m is in a range of 0 to 7;
where h is less than or equal to 1; and,
where "a" is less than or equal to 2.

15. The method of claim 14 wherein forming $A_aA'_bM_yFe_z(CN)_n \cdot mH_2O$ particles includes forming $A_aA'_bM_yFe_z(CN)_n \cdot mH_2O$ particles having a framework and interstitial spaces in the framework, where A and A' occupy interstitial spaces.

16. The method of claim 14 wherein preparing the first solution of $A_xFe(CN)_6$ and $Fe(CN)_6$ includes the A cations being selected from a group consisting of lithium (Li), sodium (Na), potassium (K), rubidium (Rb), caesium (Cs), calcium (Ca), and magnesium (Mg).

17. The method of claim 14 wherein adding A'-ions to the solution includes the A' metal dopant being a material other than A, selected from a group consisting of ammonium-ion ($NH_4^+$), Li, Na, K, Rb, Cs, Ca, and Mg.

18. The method of claim 14 wherein adding the first solution to the second solution containing M-ions includes the M-ions being selected from a group consisting of titanium (Ti), vanadium (V), chromic (Cr), manganese (Mn), iron (Fe), cobalt (Co), nickel (Ni) copper (Cu), zinc (Zn), niobium (Nb), ruthenium (Ru), tin (Sn), indium (In), and cadmium (Cd).

19. The method of claim 14 wherein preparing the first solution of $A_xFe(CN)_6$ and $Fe(CN)_6$ includes the $Fe(CN)_6$ being a material selected from a group consisting of ferrocyanide ($[Fe(CN)_6]^{4-}$) and ferricyanide ($[Fe(CN)_6]^{3-}$).

20. The method of claim 14 wherein preparing the first solution of $A_xFe(CN)_6$ and $Fe(CN)_6$ includes the $A_xFe(CN)_6$ having a molar concentration in a range of 0.001 moles (M) to 2 M; and,
  wherein adding the first solution to the second solution containing M-ions includes the M-ions having a molar concentration in a range of 0.001 M to 10 M.

21. A method for synthesizing a metal-doped transition metal hexacyanoferrate (TMHCF) battery electrode, the method comprising:
  preparing a first solution of $A_4Fe(CN)_6$ and $Fe(CN)_6$;
    where A cations are selected from a group consisting of alkali and alkaline-earth cations;
  adding the first solution to a second solution containing M-ions and M'-ions, forming a mixture;
    where M is a transition metal;
    where M' is a metal dopant;
  subsequent to stirring, precipitating the mixture;
  forming $A_xM_cM'_dFe_z(CN)_n \cdot mH_2O$ particles;
    where x is less than or equal to 2;
    where n is in a range of 1 to 6;
    where m is in a range of 0 to 7;
    where d is less than or equal to 1;
    where c is less than or equal to 2; and,
    where z is in a range of 0.1 to 2.

22. A method for synthesizing a metal-doped transition metal hexacyanoferrate (TMHCF) battery electrode, the method comprising:
  preparing a first solution of $A_4Fe(CN)_6$ and $Fe(CN)_6$,
    where A cations are selected from a group consisting of alkali and alkaline-earth cations;
  adding the first solution to a second solution containing 1V
    where M is a transition metal;
  adding A'-ions to a solution selected from a group consisting of the first solution, the second solution, and both the first and second solutions, forming a mixture, where A' is a metal dopant;
  subsequent to stirring, precipitating the mixture;
  forming $A_aA'_bM_yFe_z(CN)_n \cdot mH_2O$ particles;
    where n is in a range of 1 to 6;
    where y is less than or equal to 2;
    where z is in a range of 0.1 to 2;
    where m is in a range of 0 to 7;
    where b is less than or equal to 1; and,
    where "a" is less than or equal to 2.

* * * * *

UNITED STATES PATENT AND TRADEMARK OFFICE
CERTIFICATE OF CORRECTION

PATENT NO. : 8,968,925 B2  
APPLICATION NO. : 13/907892  
DATED : March 3, 2015  
INVENTOR(S) : Yuhao Lu et al.

Page 1 of 1

It is certified that error appears in the above-identified patent and that said Letters Patent is hereby corrected as shown below:

In the Claims

Column 9, line 28, claim 4, the term "Rb" has been incorrectly printed as --Rh--.

Column 10, line 20, claim 13, the phrase "M-ions" has been incorrectly printed as --Ni-ions--.

Column 10, line 42, claim 14, the term "b" has been incorrectly printed as --h--.

Column 10, line 56, claim 17, the phrase "ammonium-ions" has been incorrectly printed as --ammonium-ion--.

Column 12, line 9, claim 22, the term "M-ions" has been incorrectly printed as --1 V--.

Signed and Sealed this  
Second Day of June, 2015

Michelle K. Lee  
*Director of the United States Patent and Trademark Office*